United States Patent [19]

Iida et al.

[11] Patent Number: 4,746,722

[45] Date of Patent: May 24, 1988

[54] CHOLESTERIC LIQUID CRYSTAL POLYESTERS

[75] Inventors: Shigeki Iida, Yokohama; Yoshihiro Kobori, Kamakura; Hajime Hara, Fujisawa; Tomohiro Toya; Tetsuo Satoh, both of Yokohama, all of Japan

[73] Assignee: Nippon Oil Company, Limited, Tokyo, Japan

[21] Appl. No.: 65,312

[22] Filed: Jun. 22, 1987

[30] Foreign Application Priority Data

Jun. 26, 1986 [JP]  Japan .................. 61-148170

[51] Int. Cl.⁴ .................. C08G 63/02; C08G 63/76
[52] U.S. Cl. .................. 528/194; 528/176; 528/193; 528/272; 528/302; 528/308.7; 525/437
[58] Field of Search ............... 528/176, 193, 194, 272, 528/302, 308.7; 525/437

[56] References Cited

U.S. PATENT DOCUMENTS

| | | | |
|---|---|---|---|
| 4,390,681 | 6/1983 | Deex ........................ | 528/193 |
| 4,652,626 | 3/1987 | Orii et al. ................. | 528/194 |
| 4,698,397 | 10/1987 | Toya et al. ................ | 525/437 |

*Primary Examiner*—Lucille M. Phynes
*Attorney, Agent, or Firm*—Scully, Scott, Murphy & Presser

[57] ABSTRACT

A cholesteric liquid crystal polyester consisting essentially of the following structural units (A), (B), (C) and (D):

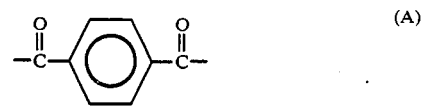

(A)

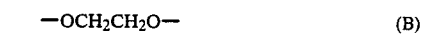

(B)

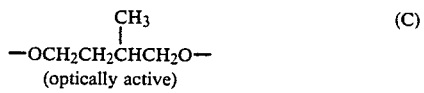

(C)

(optically active)

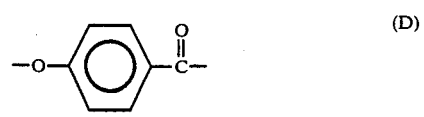

(D)

4 Claims, No Drawings

CHOLESTERIC LIQUID CRYSTAL POLYESTERS

BACKGROUND OF THE INVENTION

The present invention relates to novel aromatic polyesters capable of being subjected to melt-processing, having high strength and high modulus properties and exhibiting reduced anisotropy when formed into films or sheets.

Recently there has been increasing demand for materials which exhibit high modulus and superior resistance to heat and to chemicals when formed into any of fibers, films and shaped articles. Although conventional polyesters are in use for various shaped articles, many of them are inferior in mechanical properties such as flexural modulus and so they have heretofore been unsuitable for uses requiring such high strength and high modulus properties. As a method for improving such mechanical properties, it has been known to incorporate fillers or reinforcing materials, e.g. calcium carbonate or glass fibers, into conventional polyesters. However, such conventional method causes problems in practical use; for example, the blended fillers or reinforcing materials would spoil the light weight characteristic, which is a feature of plastics, because of increasing specific gravity of the resulting blend, and molding machines would be subjected to heavy wear during molding operations.

Liquid crystal polyesters have come to be noted recently as melt-processable polymers suitable for uses requiring high strength and high modulus properties without fillers or reinforcing materials. Special attention has been paid to such liquid crystal polyesters since W. J. Jackson made public thermoplastic liquid crystal polyesters comprising polyethylene terephthalate and hydroxybenzoic acid in U.S. Pat. No 3,804,805 and Journal of Polymer Science Polymer Chemistry Edition, Vol.14, page 2043 (1976). Since then, various liquid crystal polyesters have been developed and studied with a view to attaining both improvement of mechanical properties, and melt-processability. However, these liquid crystal polymers have been unsuitable for such uses as films and sheets because their films or sheets exhibit a marked anisotropy in their mechanical properties due to orientation of the polymer molecules parallel to the flow direction in the melt.

As means for eliminating such anisotropy, the use of a cholesteric liquid crystal polymer has been proposed by W. R. Krigbaum et al (see U.S. Pat. No. 4,412,059). In this patent, however, although liquid crystal polyesters are noted, no description is found as to whether the said polyesters exhibit cholesteric liquid crystalline mesophase or not. Further, as will be described later, in order to obtain a film or sheet having high strength and high modulus properties, and reduced anisotropy, several specific characteristics must be required for the cholesteric liquid crystal polymers. But it is quite unknown whether the polyesters mentioned by Krigbaum have such characteristics or not. Moreover, there are not disclosed optically active diols as an optically active component in the above U.S. patent.

For obtaining a high strength and high modulus film or sheet with reduced anisotropy by melt-processing, a cholesteric liquid crystal polymer must satisfy several important requirements, which are as follows. (1) The said polymer should have high strength and high modulus properties in fibers when it is processed in a nematic state. (2) The cholesteric liquid crystal should take a laminar structure in which polymer molecules lie parallel to the film or sheet surface (the cholesteric helical axes are perpendicular to the surface). (3) Polydomain texture composed of a great number of small birefringent regions similar to polycrystalline structure must be transformed into a Granjean planar texture.

The above requirements are not referred to at all in the foregoing U.S. Pat. No. 4,412,059 in connection with the thermotropic liquid crystal polyesters disclosed therein. Therefore, it has been keenly desired to develop a cholesteric liquid crystal polyester capable of satisfying the aforementioned require ments to obtain a high strength and high modulus film or sheet with reduced anisotropy.

SUMMARY OF THE INVENTION

It is the object of the present invention to provide liquid crystal polyesters capable of being subjected to melt-processing and suitable for obtaining a high strength and high modulus film or sheet with reduced anisotropy.

The liquid crystal polyesters of the present invention exhibit superior mechanical properties as a fiber when they are processed in a nematic state, and they have a peculiar characteristic in that a laminar structure of cholesteric liquid crystal mesophase easily in parallel with the film or sheet surface. They consist essentially of structural units represented by the following formulae (A), (B), (C) and (D):

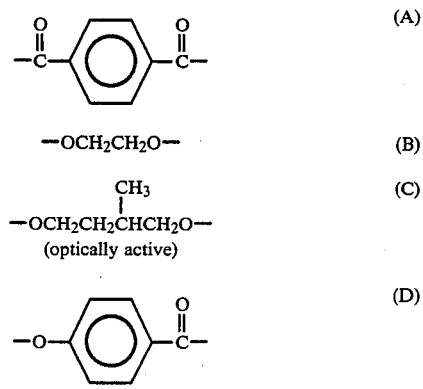

DETAILED DESCRIPTION OF THE INVENTION

The cholesteric liquid crystal polyesters of the present invention will be described in detail hereinunder.

The structural unit (A) is derived from terephthalic acid or a derivative thereof (e.g. dialkyl ester such as dimethyl ester) and is present in a proportion of 10 to 40 mol%, preferably 10 to 30 mol%.

The structural unit (B) is derived from ethylene glycol or a derivative thereof (e.g diacetylated compound) and is present in a proportion of 10 to 40 mol%, preferably 10 to 30 mol%.

The structural unit (C) is derived from 2-methyl-1,4-butanediol or a derivative thereof (e.g. diacetylated compound) and is present in a proportion of 0.1 to 40 mol%, preferably 1 to 10 mol%. It is characterized by being optically active.

The structural unit (D) is derived from p-hydroxybenzoic acid or a derivative thereof (e.g. acetylated compound) and is present in a proportion of 20 to 80 mol%, preferably 30 to 70 mol%.

As the structural unit (C), which is essential for developing cholesteric liquid crystalline mesophase, there may be used either R or S isomer resolved from a racemic mixture. Even a R-S mixture, which exhibits optical activity when either one is present in a larger proportion, is also employable. In this case, however, the helical pitch of the cholesteric liquid crystal polymer becomes larger than that of a liquid crystal polymer having the same amount of pure R or S isomer, so that the cholesteric twisting power becomes less efficient. In general, the difference in content between R and S isomers should be not smaller than 15%, preferably not less than 30%.

In a cholesteric liquid crystal polymer, a nematic liquid crystal layer is somewhat twisted by an optically active unit, taking a helical structure. A cholesteric liquid crystal polymer in which a rigid straight chain and an optically active monomer are copolymerized in the main chain is expected to afford a film or sheet having a biaxially reinforced structure as if it were a laminated structure.

Thermoplastic cholesteric liquid crystal polyesters of the present invention are characterized by affording shaped articles which are less anisotropic in physical properties while maintaining superior mechanical properties even when they are processed at a high shear rate condition.

As a thermotropic cholesteric liquid crystal polymer is heated up slowly under a polarizing microscope equipped with a hot stage, a crystalline state is transformed into a liquid crystal state at a certain temperature and oily streaks or finger print patterns peculiar to cholesteric liquid crystal polymers are sometimes observed. Further, if such polymers are formed into a film followed by rapid cooling, the cholesteric liquid crystal structure will be maintained in a solid film.

When the pitch length of the cholesteric helix is close to the wavelength of visible light, it will be possible to observe a bright cholesteric color which varies depending on the content of chiral component in the structural unit (C).

The cholesteric liquid crystal polyesters of the present invention can be prepared by a known melt-condensation process. For example, a polyester or an oligoester is prepared beforehand from the structural units (A), (B) and (C) and then it is reacted with acetoxybenzoic acid having the structural unit (D) to allow acidolysis to take place, then polycondensation is allowed to proceed for the resulting oligoester at a high temperature under a high vacuum to obtain the desired liquid crystal copolyester. Alternatively, a polyester or oligoester comprising the structural units (A), (B) and (C) is reacted with hydroxybenzoic acid having the structural unit (D), thereby allowing acidolysis to take place, then acetic anhydride is added to the resulting oligoester, and finally polycondensation is allowed to proceed at a high temperature under a high vacuum to obtain the desired liquid crystal copolyester.

It is also possible to effect the preparation by reacting the constituent monomer of the structural unit (C) with the constituent monomer(s) of the structural unit (A) and/or (D) in advance to obtain an oligomer, and then polycondensing the oligomer with the polyester or oligoester composed of the structural units (A), (B) and (D). According to this method, not only a cholesteric liquid crystal polyester of a desired higher molecular weight can be prepared, but also infusible or isotropic polymers, which are formed by the homopolymerization of oxybenzoic acids, is suppressed to produce, making it possible to obtain a homogeneous polymer.

For the purpose of accelerating transesterification or polycondensation there may be used known catalysts such as alkali metal salts or metallic salts of Fe, Mn, Cd, Mg, Ba, Ti, Zn, Pb, Co, Sb and Sn, aline or in combination. Moreover, phosphorus compounds may be used as decomposition inhibitors.

The cholesteric liquid crystal polyester thus obtained can be subjected to melt-processing at a temperature not higher than 350° C. to afford a shaped article having superior mechanical properties and yet being less anisotropic in physical properties.

The following examples are given to further illustrate the present invention, but it is to be understood that the invention is not limited thereto.

EXAMPLE 1

(1) Preparation of Copolyester 194 g of dimethyl terephthalate, 94.4 g of ethylene glycol, 21.7 g of (S)-2-methyl-1,4-butanediol and 77 mg of n-butyl orthotitanate were charged into a reactor equipped with a stirrer. After purging with nitrogen, reaction was allowed to take place at 180° C. for 2 hours while passing nitrogen, followed by further stirring at 200° C. for 1 hour. After the bulk of methanol had been distilled off, the degree of vacuum was increased gradually and the temperature was also raised from 200° C. until reaching the conditions of 250° C., 0.5 mmHg over a period of about 1 hour. Under this condition the stirring was continued for 0.5 hour to complete the polymerization.

Yield was 91% and inherent viscosity ($\eta$inh) of the resultant polymer as determined at 30° C. and at a concentration of 0.5 wt.% using a mixed solvent of phenol/tetrachloroethane=60/40 (weight ratio) was 0.5 dl/g. (The following values of $\eta$inh were also determined in this manner.)

(2) Preparation of Cholesteric Liquid Crystal Polyester 11.8 g of the copolyester prepared above, 24.8 g of p-hydroxybenzoic acid and 7.2 mg of stannous acetate were charged into a reactor equipped with a stirrer, and after purging with nitrogen, reaction was allowed to take place at 240° C. for 2 hours while passing nitrogen. Then, 18.2 g of acetic anhydride was added and stirring was continued for 1.5 hours. The temperature was raised to 275° C. while distilling off acetic acid and thereafter acetic acid was distilled off completely under reduced pressure. Stirring was continued for 5 hours while maintaining the degree of vacuum at 0.5 mmHg to complete the polycondensation.

Polymer of $\eta$inh=0.39 dl/g was obtained in 88% yield. The content of the structural unit (C) obtained from 'H-NMR as determined using trifluoroacetic acid as a solvent was 3.3 mol%.

(3) Forming into Film 0.3 g of the polymer thus obtained was placed centrally in a 18 cm long by 5 cm wide aluminum frame (fabricated to permit only unidirectional flow), then heated to 300° C. and pressed, and allowed to stand for 15 minutes in a pressurized state, followed by cooling with ice water in an instant to obtain a film having a thickness of about 30 $\mu$m. When observed through a polarizing microscope under a crossed nicol, the film was found to have a texture peculiar to cholesteric liquid crystal. Further, when the film was torn off at a liquid nitrogen temperature and the fractured surface was observed using a scanning electron microscope, there was recognized a laminate structure parallel to the film surface. Test pieces were cut out in both longitudinal and transverse directions from both end portions of the film where fluidity was large during melt-pressing, and they were measured for mechanical properties. The results of the measurement will be shown in table later in this specification.

EXAMPLE 2

11.8 g of the copolyester prepared in Example 1-(1) and 32.4 g of p-acetoxybenzoic acid were charged into a reactor equipped with a stirrer, and after purging with nitrogen, the temperature was raised to 275° C. and stirring was made for 1 hour under a nitrogen stream. Then, the degree of vacuum was raised gradually up to 0.5 mmHg and stirring was continued at 275° C. for 4 hours to complete the polycondensation. Polymer of $\eta inh=0.69$ dl/g was obtained in 87% yield. The content of the structural unit (C) obtained from 'H-NMR was 3.5 mol%. A film formed from this polymer exhibited a cholesteric texture, and a laminate structure was recognized from the observation of a fractured surface of the film using a scanning electron microscope. Mechanical properties will be shown in table later in this specification.

EXAMPLE 3

Polymerization was performed under the same conditions as in Example 1 except that 5.9 g out of 11.8 g of the copolyester used in Example 1-(2) was replaced with 5.8 g of polyethylene terephthalate ($\eta inh=0.62$ dl/g) to obtain a polymer of $\eta inh=0.40$ dl/g in 89% yield. The content of the structural unit (C) determined from 'H-NMR was 1.6 mol%. A film formed from this polymer exhibited a cholesteric texture, and a laminate structure was recognized from the observation of a fractured surface of the film using a scanning electron microscope. Mechanical properties will be shown in table later in this specification.

EXAMPLE 4

(1) Preparation of Oligomer having the Structural Unit (C)

21.0 g of methyl hydroxybenzoate, 7.12 g of (S)-2-methyl-1,4-butanediol and 8 mg of n-butyl orthotitanate were charged into a reactor equipped with a stirrer and reaction was allowed to take place at 180° -200° C. for 20 hours under nitrogen stream. The reaction mixture was dissolved in ethanol and the resultant solution was poured into a large excess of water, resulting in the precipitation of solids. The solids were separated by centrifugal separation to obtain crude (S)-2-methyl-1,4-bis[4-hydroxybenzoyloxy] butane in 38% yield.

The crude product thus obtained was acetylated with acetic anhydride in the presence of a sulfuric acid catalyst, followed by recrystallization from an ethanol solution, to give (S)-2-methyl-1,4-bis[4-acetoxybenzoyloxy]butane (hereinafter referred to briefly as MABB) as white crystals, mp 46° C., in 70% yield. Its structure was identified by 'H-NMR.

(2) Preparation of Cholesteric Liquid Crystal Polyester 9.60 g of polyethylene terephthalate ($\eta inh=0.62$ dl/g), 22.1 g of p-hydroxybenzoic acid and 7.2 mg of stannous acetate were charged into a reactor equipped with a stirrer, and after puring with nitrogen, reaction was allowed to take place at 240° C. for 1 hour. Then, 19.6 g of acetic anhydride was added and stirring was made for 1.5 hour. Acetic acid was distilled off, then 4.28 g of MABB prepared in the above (1) and 0.83 g of terephthalic acid were added and reaction was allowed to take place for 0.5 hour at 240° C. and 0.5 hour at 270° C. while passing nitrogen. Then, the degree of vacuum was increased gradually to not higher than 0.5 mmHg and stirring was continued at 270° C. for 5 hours to obtain a polymer of $\eta inh=1.07$ dl/g in 90% yield. It was confirmed by 'H-NMR that 2-methyl-1,4-butanediol was copolymerized in the polymer approximately as fed.

(3) Forming into Film

In the same way as in Example 1 there was formed a film from the polymer thus obtained. The film exhibited a cholesteric texture under a polarizing microscope, and a laminate structure was recognized from the observation of a fractured surface of the film using a scanning electron microscope. The film was measured for mechanical properties, the results of which will be shown in table later in this specification.

COMPARATIVE EXAMPLE 1

Polymerization was performed under the same conditions as in Example 1 except that a racemic mixture was used in place of (S)-2-methyl-1,4-butanediol, to obtain a polymer of $\eta inh=0.38$ dl/g in 90% yield. A film formed from this polymer did not exhibit a cholesteric texture, nor was recognized a laminate structure even from the observation of its fractured surface using a scanning electron microscope. The film was measured for mechanical properties, the results of which will be shown in table later in this specification.

COMPARATIVE EXAMPLE 2

The following polymerization was carried out in accordance with Example 1 of U.S. Pat. No. 3,804,805. 69.1 g of the polyethylene terephthalate prepared in Example 1-(1) of the present invention and 97.2 g of p-acetoxybenzoic acid were charged into a polymerization tube equipped with a stirrer. After purging with nitrogen, the polymerization tube was placed in an oil bath held at 275° C. and stirring was made in a nitrogen gas stream for 1 hour. Then, the degree of vacuum was raised gradually to 0.5 mmHg and stirring was continued at 275° C. for 4 hours to complete the polycondensation. There was obtained a nematic liquid crystal polymer of $\eta inh=0.90$ dl/g in 90% yield. A film formed from this polymer did not exhibit a cholesteric texture, nor was recognized a laminate structure even from the observation of a fractured film surface using a scanning electron microscope. The film was measured for mechanical properties, the results of which are as shown in table below.

TABLE

| | Form of Liquid Crystal | $T\|$ *1 MPa | $T\perp$ *1 MPa | $T\|/T\perp$ Ratio | $M\|$ *1 GPa | $M\perp$ *1 GPa | $M\|/M\perp$ Ratio |
|---|---|---|---|---|---|---|---|
| Example 1 | Cholesteric | 71 | 53 | 1.3 | 7.2 | 6.1 | 1.2 |

TABLE-continued

|  | Form of Liquid Crystal | T∥*1 MPa | T⊥*1 MPa | T∥/T⊥ Ratio | M∥*1 GPa | M⊥*1 GPa | M∥/M⊥ Ratio |
|---|---|---|---|---|---|---|---|
| Example 2 | Cholesteric | 67 | 49 | 1.4 | 6.9 | 5.3 | 1.3 |
| Example 3 | Cholesteric | 74 | 55 | 1.3 | 7.5 | 5.6 | 1.3 |
| Example 4 | Cholesteric | 100 | 77 | 1.3 | 6.2 | 5.2 | 1.2 |
| Comparative Example 1 | Nematic | 69 | 22 | 3.1 | 4.7 | 1.6 | 2.9 |
| Comparative Example 2 | Nematic | 81 | 18 | 4.5 | 5.0 | 1.8 | 2.8 |

*1 T and M represent tensile strength and tensile modulus, respectively.
The subscripts ∥ and ⊥ represent a direction parallel to and a direction perpendicular to the flow in molding, respectively.

From the above Examples it is seen that the cholesteric liquid crystal polyesters of the present invention are less anisotropic in their mechanical properties and maintain high strength and high modulus properties even when they are melt-processed under a high shear rate condition.

What is claimed is:

1. A cholesteric liquid crystal polyester consisting essentially of the following structural units (A), (B), (C) and (D):

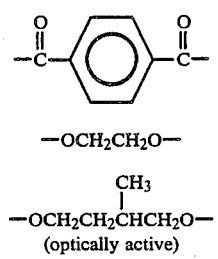

—OCH$_2$CH$_2$O— (B)

$$\begin{array}{c} CH_3 \\ | \\ -OCH_2CH_2CHCH_2O- \end{array}$$ (C)

(optically active)

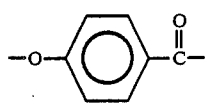

2. A cholesteric liquid crystal polyester as set forth in claim 1, containing the structural units (A), (B), (C) and (D) in proportions of 10-40 mol%, 10-40 mol%, 0.1-40 mol% and 20-80 mol%, respectively, based on the total 100 mol% of said (A) to (D).

3. A cholesteric liquid crystal polyester as set forth in claim 2, containing the structural units (A), (B), (C) and (D) in proportions of 10-30 mol%, 10-30 mol%, 1-10 mol% and 30-70 mol%, respectively, based on the total 100 mol% of said (A) to (D).

4. A process for preparing the cholesteric liquid crystal polyester of claim 1, which process comprises reacting the constituent monomer of the structural unit (C) with the constituent monomer(s) of the structural unit (A) and/or the structural unit (D) in advance to obtain an oligomer and polycondensing said oligomer with a polyester or an oligoester composed of the structural units (A), (B) and (D).

* * * * *